United States Patent
Bryant-Rich et al.

(10) Patent No.: US 9,171,004 B2
(45) Date of Patent: Oct. 27, 2015

(54) SYSTEM AND METHOD TO RESPOND TO A DATA FILE DELETION INSTRUCTION

(75) Inventors: Donald Ray Bryant-Rich, Haifa (IL); Tal Sagy, Even Yehuda (IL)

(73) Assignee: SANDISK IL LTD., Kfar Saba (IL)

( * ) Notice: Subject to any disclaimer, the term of this patent is extended or adjusted under 35 U.S.C. 154(b) by 441 days.

(21) Appl. No.: 12/400,334

(22) Filed: Mar. 9, 2009

(65) Prior Publication Data

US 2010/0228802 A1   Sep. 9, 2010

(51) Int. Cl.
*G06F 17/30* (2006.01)
*G06F 12/00* (2006.01)

(52) U.S. Cl.
CPC ...... *G06F 17/30117* (2013.01); *G06F 17/3028* (2013.01)

(58) Field of Classification Search
None
See application file for complete search history.

(56) References Cited

U.S. PATENT DOCUMENTS

| 5,745,902 A * | 4/1998 | Miller et al. ........................ 1/1 |
| 6,658,438 B1 | 12/2003 | Moore et al. |
| 7,051,251 B2 | 5/2006 | Moore et al. |
| 7,216,207 B1 | 5/2007 | Armstrong-Crews et al. |
| 7,412,558 B2 | 8/2008 | Oribe et al. |
| 2002/0012131 A1* | 1/2002 | Oteki et al. ................... 358/1.15 |
| 2003/0009480 A1* | 1/2003 | Lin et al. ....................... 707/200 |
| 2006/0117153 A1* | 6/2006 | Tran et al. ..................... 711/159 |
| 2006/0152599 A1 | 7/2006 | Yokonuma et al. |
| 2006/0173913 A1* | 8/2006 | Aoyama .................... 707/104.1 |
| 2006/0239144 A1* | 10/2006 | Gotoh et al. ............... 369/47.27 |
| 2006/0277182 A1* | 12/2006 | Nichols et al. ................... 707/9 |

* cited by examiner

Primary Examiner — Usmaan Saeed
Assistant Examiner — Yu Zhao
(74) *Attorney, Agent, or Firm* — Toler Law Group, PC

(57) ABSTRACT

Systems and methods responsive to a data file deletion instruction are disclosed. A method includes receiving an instruction to delete a data file. The data file is stored at a plurality of persistent memory cells of a memory. The memory also stores a directory that includes a first entry corresponding to the data file. In response to receiving the instruction to delete the data file, multiple attribute bits of the first entry are programmed and also a first bit of the first entry is programmed. The first bit of the first entry is distinct from the multiple attribute bits. Programming the multiple attribute bits converts the first entry from a first entry type to a second entry type. Programming the first bit of the first entry indicates that the first entry has an unused status.

28 Claims, 6 Drawing Sheets

SYSTEM AND METHOD TO RESPOND TO A DATA FILE DELETION INSTRUCTION

FIELD OF THE DISCLOSURE

The present disclosure is generally related to responding to a data file deletion instruction.

BACKGROUND

Non-volatile semiconductor memory devices, such as removable storage cards or Universal Serial Bus (USB) flash memory devices, have enabled increased portability of data and software applications. Some non-volatile semiconductor memory devices persistently store data, such as at one-time programmable (OTP) or write-once read-many (WORM) memory that does not allow data to be deleted after being written. However, users of the semiconductor memory devices may desire to render data stored at the memory device unavailable, such as when the stored data may be private, embarrassing, or otherwise sensitive. For example, a user of a camera may desire to remove access to one stored image that has been saved at an OTP memory. Removing the unwanted data may require destruction of other non-sensitive data on a persistent storage memory device and may require destruction of the memory device itself.

SUMMARY

Systems and methods that are responsive to a data file deletion instruction are disclosed. Upon receiving an instruction to delete a data file, multiple attribute bits of a directory entry corresponding to the data file are programmed to convert the directory entry from a first entry type to a second entry type. In addition, a first bit of the directory entry is programmed to indicate that the directory entry has an unused status. Because the directory entry has the second entry type and the unused status, the directory entry may be ignored by operating systems at host devices. As a result, even when a data storage device uses a persistent memory that does not support deletion of data, the data file may be rendered inaccessible to an operating system at a host device.

DETAILED DESCRIPTION

Figure 1:
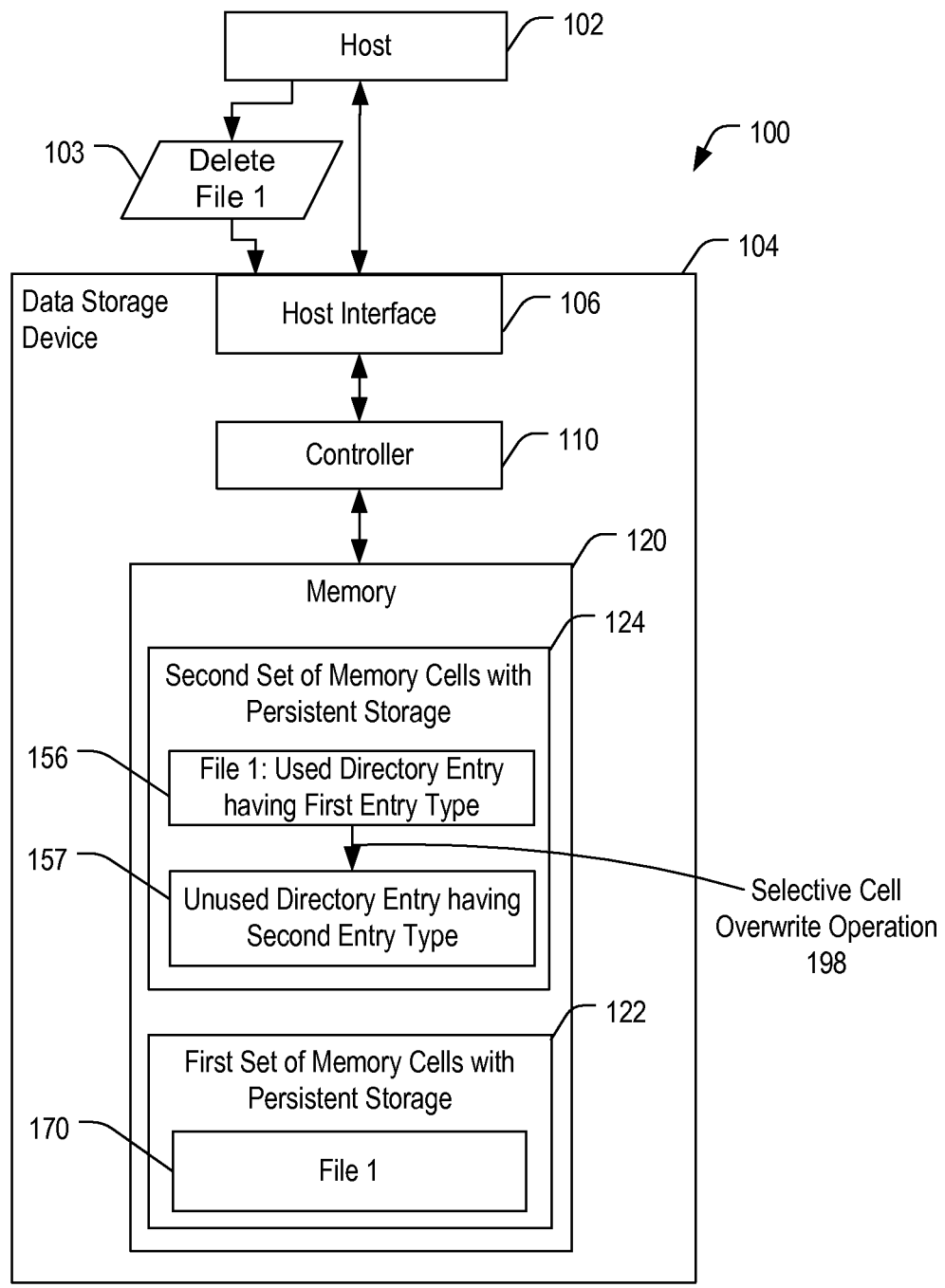
FIG. 1 is a block diagram of a first particular embodiment of a system that is responsive to a data file deletion instruction.

Referring to FIG. 1, a first particular embodiment of a system that is responsive to a data file deletion instruction is depicted and generally designated 100. The system 100 includes a host 102 in communication with a data storage device 104. The data storage device 104 includes a host interface 106 coupled to a memory controller 110. The memory controller 110 is in communication with a memory 120 that may store data in one or more sets of memory cells with persistent storage, such as a first set of memory cells with persistent storage 122 and a second set of memory cells with persistent storage 124. The memory device 104 is adapted to respond to an instruction 103 to delete a data file by converting a directory entry that is in use and that has a first entry type into an unused directory entry having a second entry type. Although the directory entry is not removed, because the directory entry is indicated as having the unused status and as having the second entry type, the directory entry will be ignored by the host 102. As a result, the corresponding data file will be rendered undetectable to the host 102. Because the data storage device 104 includes persistent storage, such as one-time programmable or write-once read-many storage, the data storage device 104 may incorporate mechanisms that prevent rewriting memory. Therefore, even though the directory entry is marked as unused, the host 102 may be prevented from writing new directory entries at the same location.

In a particular embodiment, the host 102 is a computer, such as a personal computer (PC) or notebook computer, a portable wireless device, such as a mobile or cellular telephone or a personal digital assistant (PDA), a multimedia device, such as a video player or set-top box device, or any other type of device that may communicate with the data storage device 104. In an illustrative embodiment, the data storage device 104 is removable from the host 102, such as a Flash drive or removable memory card. In another illustrative embodiment, the data storage device 104 is implemented within the host 102, such as an internal memory of a digital music player.

In a particular embodiment, a representative first data file 170 is stored at a first plurality of persistent memory cells, such as the first set of memory cells with persistent storage 122. A directory entry 156 that corresponds to the first data file 170 may be stored at a second plurality of persistent memory cells, such as the second set of memory cells with persistent storage 124. The first and second sets of memory cells with persistent storage 122 and 124 may be configured such that data values may be written to, but not erased from, the memory cells. Examples of persistent memory cells include write-once or one-time-programmable (OTP) memory cells or re-writable memory cells, such as flash memory cells that are controlled to prevent changing a stored value.

The directory entry 156 has a first entry type that indicates that the first data file 170 is associated with a particular directory. For example, in a file allocation table (FAT) file system or FAT32 file system, the directory entry 156 may indicate that the first data file 170 is stored at a particular directory of the file system. The directory entry 156 may include information that enables the host 102 to locate the first data file 170. For example, the directory entry 156 may identify one or more entries of a cluster table (not shown) that correspond to a location of the first data file 170.

The memory controller 110 may be configured to initiate a selective cell overwrite operation 198 in response to receiving the instruction 103 to delete the first data file 170. The selective cell overwrite operation 198 programs selected bits of the directory entry 156 but does not program other bits of the directory entry 156. To illustrate, when the second set of memory cells with persistent storage 124 enables a "0" value at a memory cell to be changed to a "1" value, but does not allow a "1" value to be changed to a "0" value, programming selected bits writes "1" values to the selected bits. As another example, when the second set of memory cells with persistent storage 124 enables a "1" value at a memory cell to be changed to a "0" value, but does not allow a "0" value to be changed to a "1" value, programming selected bits writes "0" values to the selected bits. Although the provided examples illustrate programming at memory cells storing single bit values, in other embodiments multiple bit values may be persistently stored at a single memory cell, such as at a multi-level NAND flash memory cell that is controlled to persistently store data values. Such memory cells storing multiple bit values may be programmed by changing one or more of the multiple bit values stored at a single memory cell to another bit value such that the memory cell cannot be returned to its original stored value.

Programming the selected bits of the directory entry 156 converts the used directory entry 156 having the first entry type into an unused directory entry 157 having the second entry type. The unused directory entry 157 having the second entry type may be ignored by the host 102, by the controller 110, or any combination thereof. Therefore, although the used directory entry 156 having the first entry type is not deleted, the resulting unused directory entry 157 having the second entry type may be ignored by an operating system accessing a file system of the data storage device 104, rendering the first data file 170 undetectable via conventional file system operations.

In addition to converting the first entry type to the second entry type and converting the directory entry to have the unused status, the selective cell overwrite operation 198 may also function to overwrite one or more pieces of filename information, file size information, or other information that may be stored at the used directory entry 156 having the first entry type. For example, as will be discussed with respect to FIG. 2, the used directory entry 156 having the first entry type may be a "short" filename directory entry in compliance with a FAT or FAT32 file system. Textual information corresponding to a short filename, such as an eight-character name and a three-character extension, may be programmed to store all "1" values, effectively removing information that may reflect a filename of the first data file 170. In a particular embodiment, one or more bits of the first data file 170 may also be programmed or selectively programmed, obscuring information stored at the first data file 170.

By selectively programming bits to convert the used directory entry having the first entry type 156 to the unused directory entry having the second entry type 157, the corresponding first data file 170 may be rendered undetectable via conventional file access operations by the host 102. In addition, file-specific data such as file name data and location data within the used directory entry 156 may be overwritten via cell programming to further disguise file data from low-level memory utilities that may locate the unused directory entry 157 having the second type. Also, the actual content of the first data file 170 may be overwritten or partially overwritten via cell programming to render file content difficult or impossible to recover. Thus, the memory storage device 104 may intelligently respond to a file deletion instruction, even when the data storage device 104 includes persistent memory that does not allow deletion of data.

Figure 2:
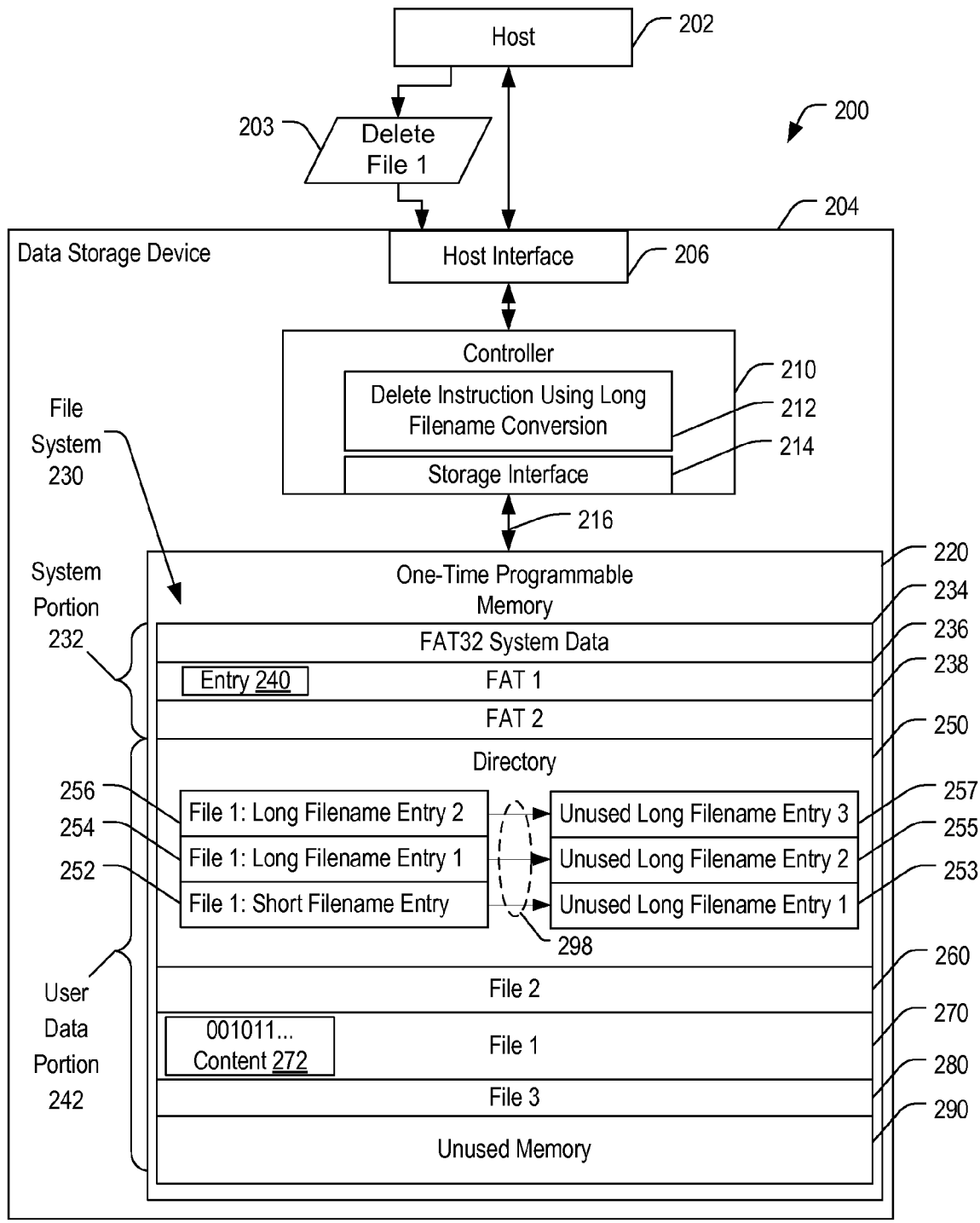
FIG. 2 is a block diagram of a second particular embodiment of a system that is responsive to a data file deletion instruction.

Referring to FIG. 2, a second particular embodiment of a system that is responsive to a data file deletion instruction is depicted and generally designated 200. The system 200 includes a host 202 in communication with a data storage device 204. The data storage device 204 implements a FAT32 operating system via a file system 230 at a one-time programmable (OTP) memory 220. The file system 230 includes a directory 250 storing multiple long filename entries and a short filename entry corresponding to a particular first file ("File 1") 270. The memory device 204 also includes a controller 210 configured to receive a delete instruction 203 to delete the first file 270, and in response, to execute a delete instruction using long filename conversion 212. By converting directory entries corresponding to the first file 270 to unused long filename entries, the data storage device 204 can disable access to the first file 270 without physically erasing content 272 of the first file 270 and without physically erasing directory entries that correspond to the first file 270.

In a particular embodiment, the data storage device 204 includes a host interface 206 that is configured to receive instructions and data from the host 202 and to send data and status information from the data storage device 204 to the host 202. The storage interface 214 is configured to enable transmission of data and instructions from the controller 210 to the one-time programmable (OTP) memory array 220 via a bus 216.

In a particular embodiment, the controller 210 is configured to execute the delete instruction using long filename conversion 212 in response to receiving the delete instruction 203 from the host device 202. The controller 210 may be configured, in response to receiving the delete instruction 203, to mark a first entry 252 as having an unused status, to mark a second entry 254 as having the unused status, and to mark a third entry 256 as having the unused status. The controller 210 may also be configured to mark the first entry 252 to indicate that the first entry 252 has a long filename format.

For example, as will be discussed with respect to FIGS. 3-4, the controller 210 may be configured to mark the first entry 252 to indicate that the first entry 252 has the long filename format by programming multiple attribute bits of the first entry 252. The controller 210 may also be configured to mark the first entry 252 as having the unused status by programming a first bit of the first entry 252, the first bit of the first entry distinct from the multiple attribute bits of the first entry 252, to mark the second entry 254 as having the unused status by programming a second bit of the second entry 254, and to mark the third entry 256 as having the unused status by programming a third bit of the third entry 256.

In a particular embodiment, the OTP memory 220 includes a system portion 232 and a user data portion 242. In a particular embodiment, the file system 230 is a FAT32 file system and the system portion 232 includes FAT32 system data 234, a first file allocation table (FAT 1) 236 and a second file allocation table (FAT 2) 238. The first file allocation table 236 may include one or more entries, such as a representative entry 240, that indicates a particular cluster of the OTP memory 220 is used for data storage. The entry 240 may include data to indicate a next cluster that is used by a particular file or may include other information such as an end-of-file (EOF) marker or an indicator that a cluster is unused. In a particular embodiment, the second file allocation table 238 may function as a redundant copy of the first file allocation table 236.

In a particular embodiment, the user data portion 242 includes a directory 250, one or more data files, such as the first data file 270, a second data file ("File 2") 260, a third data file ("File 3") 280, and unused memory 290. The second data file 260 is shown sequentially before the first data file 270 and the third data file 280 to illustrate that files may generally be stored in any order within the user data portion 242 and may be locatable to an operating system via the directory 250 and one or more entries of the file allocation tables 236 and 238.

In a particular embodiment, the directory 250 includes multiple directory entries corresponding to the first file 270. For example, the directory 250 may include the first entry 252, the second entry 254, and the third entry 256 corresponding to the first file 270. The first entry 252 may be a short filename entry and the second entry 254 and the third entry 256 may be long filename entries in compliance with a FAT32 standard. After a selective overwrite operation 298 that may be initiated by the controller 210, each of the entries 252, 254, and 256 may be converted to long filename entries having an unused status that indicates to an operating system that the respective entry is not associated with any particular data file.

During operation, in response to receiving the delete instruction 203, the controller 210 execute the delete instruction using long filename conversion 210 that results in the selective overwrite operation 298. The selective overwrite operation 298 causes the first entry 252 to be selectively programmed to convert the first entry 252 from a short filename entry type into a long filename entry type. For example, as will be discussed with respect to FIGS. 3-4, one or more attribute bits of the first entry 256 may be programmed in a manner that will cause the resulting entry to be interpreted as having a long filename entry type. In addition, as will be discussed with respect to FIGS. 3-4, a first sequential data bit of the converted long filename entry may be programmed such that the long filename entry is recognized by an operating system as having an unused status, resulting in a first unused long filename entry 253.

The selective overwrite operation 298 also causes the second entry 254 having a long filename entry type to be converted to a second unused long filename entry 255, such as by programming a first sequential bit of the second long filename entry 252. The third entry 256 having the long filename entry type may be selectively programmed to have the unused status by programming a first sequential data bit of the filename entry 256 to form a third unused long filename entry 257.

In a particular embodiment, the selective overwrite operation 298 may include overwriting additional data such as name data of one or more of the entries 252, 254, and 256. For example, textual data indicating one or more characters of a long filename or a short filename corresponding to the first file 270 may be programmed to have all "1" values. In addition, the selective overwrite operation 298 may cause one or more bits of data of the first file 270 to be programmed. For example, representative content 272 of the first file 270 may include "0" values and "1" values. At least one of the "0" values may be overwritten with "1" values to obscure or to render unreadable the content 272 of the first file 270. For example, the entire content 272 of the first data file 270 may be overwritten with "1" values, effectively erasing all information stored at the first file 270.

Figure 3:
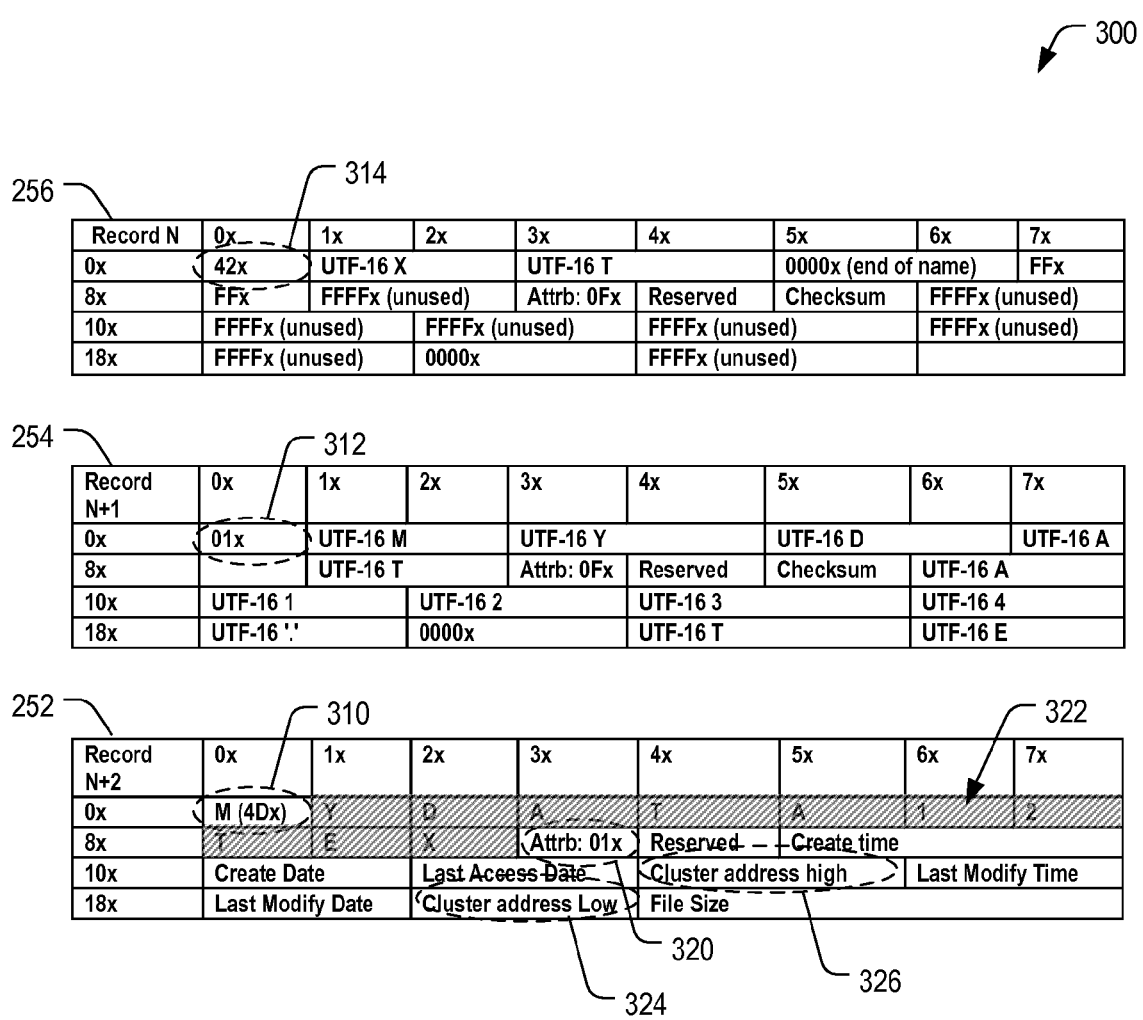
FIG. 3 is a general diagram illustrating a particular embodiment of directory entries of FIG. 2 prior to responding to a data file deletion instruction.

Referring to FIG. 3, an illustration of a particular embodiment of directory entries of FIG. 2 prior to responding to a data file deletion instruction is depicted and generally designated 300. The first entry 252 is illustrated as a short filename entry having a first sequential byte 310 storing a hexadecimal value of "4D" (i.e. "4Dx"), corresponding to the letter "M". The first entry 252 stores additional name data representing at least one alphanumeric character of a short filename, illustrated as the alphanumeric characters "MYDATA12". In addition, the first entry 252 includes data indicating a filename extension, illustrated as the first three bytes of the second row storing data corresponding to the alphanumeric characters "TEX". Multiple attribute bits 320 are shown at the fourth byte of the second row having a "01x" value. The "01x" value is a hexadecimal representation of the binary value "0000 0001," which may be recognized by FAT32 operating systems as corresponding to a short filename entry type having a short filename format.

The first sequential byte 310 includes a first sequential bit at a first location of the first entry 256. The multiple attribute bits 320 are at a second location that is separated from the first location by at least one bit. For example, a span of bits 322 separates the first sequential bit of the first sequential byte 310 from the multiple attribute bits 320. The span of bits 322 includes the seven less-significant bits (not shown) of the first sequential byte 310 and also includes multiple other bytes storing name data. As will be discussed with respect to FIG. 4, one or more bits of the span of bits 322 are programmed independently of the instruction 203 to delete the data file.

The first entry 252 also includes a thirty-two bit reference to an entry of a file allocation table. For example, the first entry 252 includes a two-byte (i.e. sixteen-bit) cluster address high value 326 and a two-byte cluster address low value 324. When combined, the cluster address values 324 and 326 form a thirty-two bit reference that identifies a cluster entry, such as the entry 240 of the first file allocation table 236 of FIG. 2, that identifies a first cluster corresponding to the first file 270.

The second entry 254 is a first long filename entry that includes a first sequential byte 312 having a "01x" value indicating that the second entry 254 is a first sequential long filename directory entry of multiple long filename directory entries that correspond to a single file. The second entry 254 also includes textual data, including second name data that represents at least one alphanumeric character of a long filename that exceeds eight characters, illustrated as "MYDATA1234.TEXT". The second entry 254 also includes attribute data illustrated at the fourth byte of the second row of the entry. The attribute data has a value of "0Fx" that corresponds to the binary value "0000 1111". The four "1" values of the attribute data indicate that the second entry 254 is a long filename entry having a long filename format.

The third entry 256 functions as a continuation of the second entry 254. A first sequential byte 314 of the third entry 256 has a value "42x", which indicates that the third entry 256 is the second sequential long filename entry that corresponds to the first file 270, and also the last long filename entry of the sequence. The third entry 256 includes filename data representing alphanumeric characters "XT" followed by an end-of-name indicator, as the last two characters of the long filename. The third entry 256 includes a "0Fx" attribute value, identifying the third entry 256 as a long filename entry having a long filename format.

When read by an operating system that supports long filenames, the first entry 252 may be read to acquire the cluster address high value 326 and the cluster address low value 324 to locate a starting cluster of the first file 270. In addition, the multiple attribute bits 326 of the first entry 252 may be read to determine file attributes associated with the first file 270, such as read-only, hidden, system, volume label, or other file attributes. The second entry 254 and the third entry 256 may be read to acquire the long filename representation of the first file 270. As illustrated, the short filename of the first file 270 has an 8.3 format "MYDATA12.TEX", while the long filename of the first file 270 is "MYDATA1234.TEXT".

Figure 4:
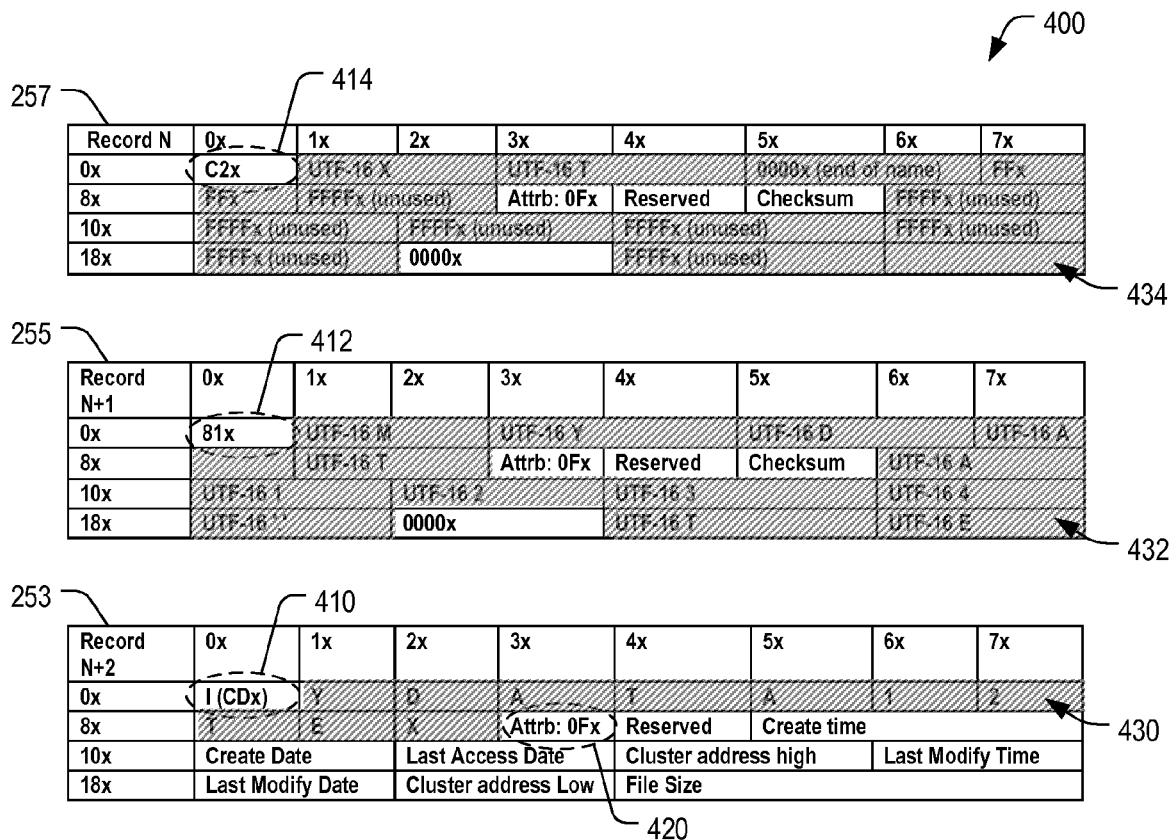
FIG. 4 is a general diagram illustrating a particular embodiment of directory entries of FIG. 3 after responding to a data file deletion instruction.

Referring to FIG. 4, an illustration of a particular embodiment of directory entries of FIG. 3 after responding to a data file deletion instruction is depicted and generally designated 400. The first entry 252 of FIG. 3 has been converted to an unused long filename entry 253. The first entry 252 is converted from a short filename type having a short filename format to a long filename type having a long filename format by programming the least significant four bits of the multiple attribute bits 420 to all "1" values, resulting in a "0Fx" byte value. In addition, the first sequential (i.e., the most significant) bit of the first sequential byte 410 has been programmed to have a "1" value, marking the unused long filename entry 253 as having the unused status. To illustrate, the first byte has been programmed from a "4Dx" value that is equivalent to a binary value "0100 1101" to a "CDx" value that is equivalent to a binary value "1100 1101". The "1" value of the first sequential bit of the first sequential byte of a long filename entry may indicate to an operating system that the long filename entry is not used, and thus the entry will be ignored by the operating system.

One or more other bits of the first sequential byte 410 may be programmed independently of the data file deletion instruction. For example, one or more other bits of the first sequential byte 410 may not be programmed and have "0" values. One or more other bits may be programmed to have "1" values. However, the other bits of the first sequential byte 410 that are programmed to have "1" values are not programmed in response to the data file deletion instruction.

The second entry 254 of FIG. 3 has been converted into the second unused long filename entry 255 by programming a binary "1" value to a first sequential bit of a first sequential byte 412 of the second unused long filename entry 255. Programming the binary "1" value changed the prior value of "01x" that is equivalent to the binary value "0000 0001" to "81x" that is equivalent to the binary value "1000 0001". Programming the binary "1" value marks the second unused long filename entry 255 as having the unused status.

The third entry 256 of FIG. 3 has been converted into the third unused long filename entry 257 by programming a binary "1" value to a first sequential bit of a first sequential byte 414 of the third unused long filename entry 257. Programming the binary "1" value changed the prior value of "42x" that is equivalent to the binary value "0100 0010" to "C2x" that is equivalent to the binary value "1100 0010". Programming the binary "1" value marks the third unused long filename entry 257 as having the unused status.

As a result, after programming the first bit and the multiple attribute bits of the first entry 252 of FIG. 3, the first entry 252 may be recognizable to a host as the first unused long filename entry 353. After programming the second bit of the second entry 254 of FIG. 3, the second entry 254 may be recognizable to a host as the second unused long filename entry 355. After programming the third bit of the third entry 256 of FIG. 3, the third entry 356 may be recognizable to a host as the third unused long filename entry 257. The host may ignore each unused entry 253, 255, and 257 and may therefore not locate the corresponding first file 270.

A first shaded area 430 indicates a first plurality of bits that stores first name data of the first file 270. The first name data represents at least one alphanumeric character of a short filename. A second shaded area 432 indicates a second plurality of bits that stores second name data of the first file 270. The second plurality of bits includes a greater number of bits than the first plurality of bits due to a difference between the short filename format and the long filename format. The second name data represents at least one alphanumeric character of a long filename. A third shaded area 434 indicates a third plurality of bits that stores third name data of the first file 270. The third name data represents at least one alphanumeric character of a long filename. One or more bits of the first plurality of bits indicated by the first shaded region 430, the second plurality of bits indicated by the second shaded region 432, the third plurality of bits indicated by the third shaded region 434, or any combination thereof, may be programmed to obfuscate or to render unreadable the filename data to an operating system or to a low-level memory utility.

Figure 5:
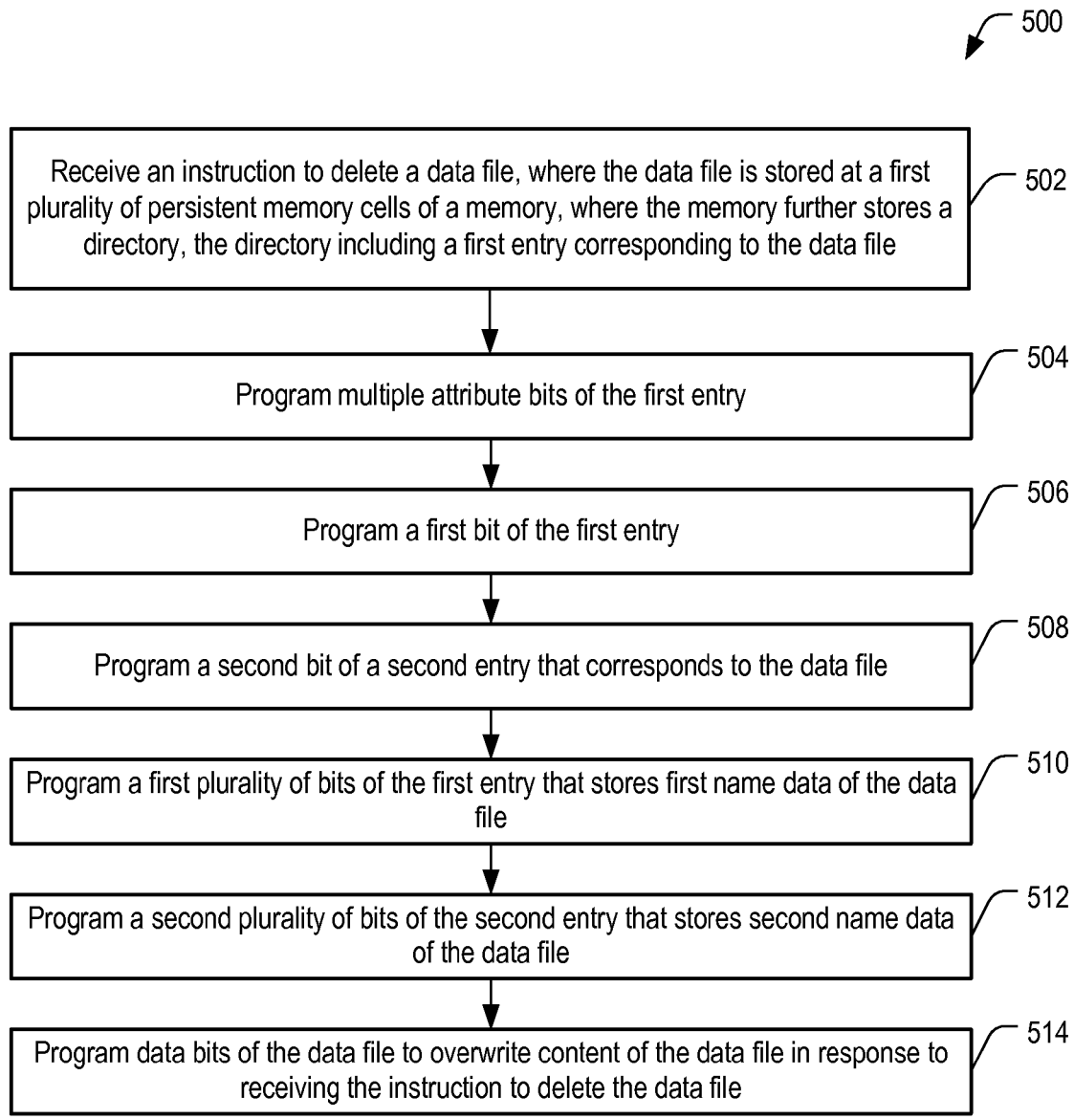
FIG. 5 is a flow diagram of a particular embodiment of a method of responding to a data file deletion instruction.

Referring to FIG. 5, a particular embodiment of a method of responding to a data file deletion instruction is depicted and generally designated 500. In an illustrative embodiment, the method 500 may be performed at the data storage device 104 of FIG. 1 or the data storage device 204 of FIG. 2.

The method 500 includes receiving an instruction to delete a data file. The data file is stored at a first plurality of persistent memory cells of a memory, such as the first data file 170 stored at the first set of memory cells with persistent storage 122 of FIG. 1. The memory also stores a directory that includes a first entry corresponding to the data file, such as the used directory entry having the first entry type 156 of FIG. 1 or the first entry 252 of FIG. 2. The directory may be stored at a second plurality of persistent memory cells, such as the second set of memory cells with persistent storage 124 of FIG. 1. The directory may include file allocation data that corresponds to a thirty-two bit file allocation table (FAT32) format. To illustrate, the directory may include the short filename entry 252 depicted in FIG. 3 having the two-byte cluster high address 326 and the two-byte cluster low address 324.

In response to receiving the instruction to delete the data file, multiple attribute bits of the first entry are programmed, at 504. Programming the multiple attribute bits converts the first entry from a first entry type to a second entry type. In a particular embodiment, the first entry type is a short filename entry and the second entry type is a long filename entry. For example, the attribute bits of the attribute field 320 of FIG. 3 having the "01x" value may be programmed to have the "0Fx" value of the attribute field 420 of FIG. 4. The "01x" value may correspond to a short filename entry, and the "0Fx" value may correspond to a long filename entry.

Also in response to receiving the instruction to delete the data file, a first bit of the first entry is programmed, at 506. Programming the first bit of the first entry indicates that the first entry has an unused status. In a particular embodiment, the first bit is at a first location of the first entry and the multiple attribute bits are at a second location of the first entry. At least one bit may separate the first location from the second location and may be programmed independently of the instruction to delete the data file. For example, the first bit may be a first sequential or most significant bit of the first sequential byte 310 of the short filename entry 253 depicted in FIG. 3. The first bit of the first sequential byte 310 is separated from the attribute bits 320 by the span of bits 322 including the remaining bits of the first sequential byte 310 that may be programmed independently of the instruction to delete the data file.

In response to receiving the instruction to delete the data file, in a particular embodiment, a second bit of a second entry may be programmed, at 508. For example, the first entry may be encoded as a short filename entry, and the directory may also include a second entry that is encoded as a first long filename entry corresponding to the data file. The short filename entry may include an eight-character filename and a three-character file extension, and the first long filename entry may include at least a portion of a long filename that exceeds eight characters. Programming the second bit of the second entry may indicate that the first long filename entry has the unused status. To illustrate, the short filename entry may be the first entry 252 and the first long filename entry may be the second entry 254 depicted FIG. 3. The second bit of the second entry may be the first sequential or most significant bit of the first sequential byte 312 of the second entry 254.

In response to receiving the instruction to delete the data file, in a particular embodiment, a first plurality of bits of the first entry that stores first name data of the data file are programmed, at 510. The first name data may represent at least one alphanumeric character of a short filename. For example, the first plurality of bits may be the first plurality of bits indicated by the first shaded region 430 of FIG. 4.

A second plurality of bits of the second entry that stores second name data of the data file may also be programmed, at 512. The second name data may represent at least one alphanumeric character of a long filename. The second plurality of bits may include a greater number of bits than the first plurality of bits. For example, the second plurality of bits may be the second plurality of bits indicated by the second shaded region 432 of FIG. 4, which includes more bytes, and therefore a greater number of bits, than the first plurality of bits indicated by the first shaded region 430.

The directory may include additional entries corresponding to the data file. For example, the directory may further include a third entry, such as the third entry 256 depicted in FIG. 3, that is encoded as a second long filename entry corresponding to the data file. In response to receiving the instruction to delete the data file, a third bit of the third entry may be programmed and a third plurality of bits of the third entry that stores third name data of the data file may be programmed. Programming the third bit of the third entry may indicate that the second long filename entry has the unused status. To illustrate, the third bit may be the first sequential or most significant bit of the first sequential byte 314 of the third entry 256, and the third plurality of bits may be the third plurality of bits 434 depicted in FIG. 4.

In a particular embodiment, data bits of the data file are programmed to overwrite content of the data file in response to receiving the instruction to delete the data file, at 514. For example, one or more bits of the first file 270 may be programmed to have "1" values, changing the content 272 of the first file 270.

Although the method 500 is illustrated and described as having a particular order, in other embodiments operations following receiving the instruction to delete the data file, at 502, may be performed in any other order. In addition, one or more operations may be performed substantially simultaneously or at least partially in parallel with each other. Also, although the method 500 is illustrated in a particular embodiment that includes several operations, in other embodiments the method may not include one or more illustrated operations or may include additional operations.

Figure 6:
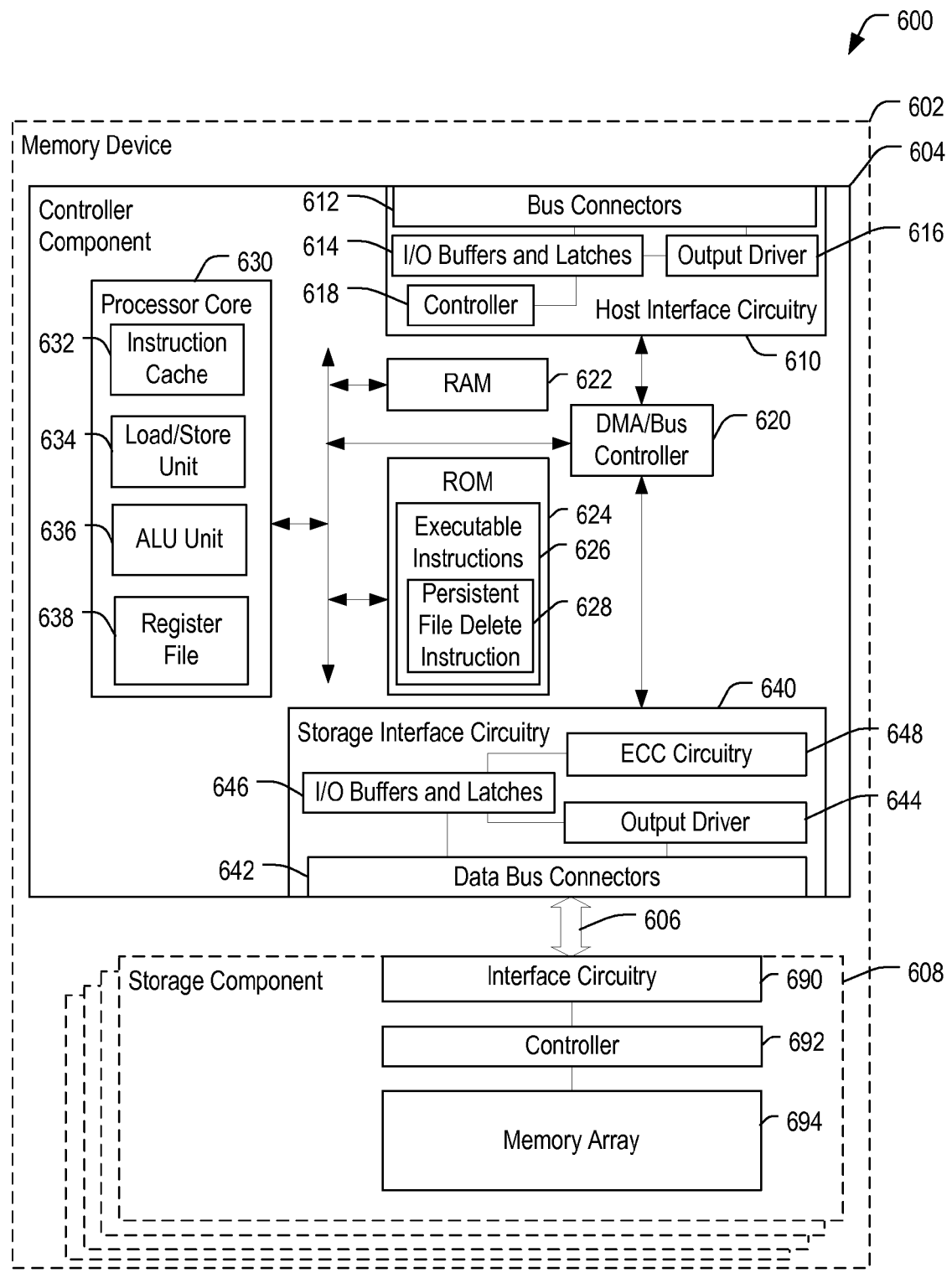
FIG. 6 is a block diagram of an illustrative system that can be used to respond to a data file deletion instruction.

Referring to FIG. 6, an illustrative embodiment of a system that can be used to respond to a data file deletion instruction is depicted and generally designated 600. The system 600 includes a memory device 602 that includes a controller component 604 coupled to one or more storage components, such as a representative storage component 608, via a bus 606. The representative storage component 608 includes interface circuitry 690 to communicate via the bus 606. The storage component 608 also includes a controller 692 that is coupled to the interface circuitry 690 and that is also coupled to a memory, such as a memory array 694. The memory array 694 may include one or more types of storage media such as a flash memory, a one-time programmable memory, other memory, or any combination thereof. In a particular embodiment, the memory device 602 may be the data storage device 104 of FIG. 1 or the data storage device 204 of FIG. 2.

In a particular embodiment, the controller component 604 includes host interface circuitry 610 coupled to a direct memory access (DMA)/bus controller 620. The controller component 604 also includes storage interface circuitry 640 that is coupled to the DMA/bus controller 620. A processor core 630, a random access memory (RAM) 622 and a read-only memory (ROM) 624 are coupled to the DMA/bus controller 620 via an internal bus.

In a particular embodiment, the host interface circuitry 610 includes bus connectors 612 coupled to input/output (I/O) buffers and latches 614. The bus connectors 612 are further coupled to output driver circuitry 616. The host interface circuitry 610 also includes a controller 618. In a particular embodiment, the host interface circuitry 610 operates in accordance with a universal serial bus (USB) protocol. For example, the controller 618 may be programmed to receive USB protocol instructions and data from a host device (not shown) via the bus connectors 612 that are coupled to a universal serial bus. The controller 618 may include a hardware processor that executes instructions stored at an internal memory, such as a read-only memory (not shown) to enable receipt and acknowledgment of USB instructions and data. Alternatively, or in addition, the host interface circuitry 610 may be configured to support other communication protocols, such as a Secure Digital (SD) protocol, a small computer system interface (SCSI), parallel interface (SPI), a Compact Flash (CF) protocol, one or more other protocols, or any combination thereof.

In a particular embodiment, the processor core 630 includes an instruction cache 632, a load/store unit 634, an arithmetic logic unit (ALU) unit 636, and a register file 638. The processor core 630 may include, or may function substantially similarly to, an ARM core, as an illustrative, non-limiting example. For example, the processor core 630 may support a reduced instruction set computer (RISC) microarchitecture. The processor core 630 may be configured to retrieve data and executable instructions 626 via the load/store unit 634 from the read only memory 624. The executable instructions 626 may include a persistent file delete instruction 628 that may initiate a selective cell programming operation to convert a used directory entry having a first type to an unused directory entry having a second type that may be ignored by host operating systems. For example, the persistent file delete instruction 628 may be executable by the processor core 630 to initiate the selective cell overwrite operation 198 described with respect to FIG. 1. As another example, the persistent file delete instruction 628 may be the delete instruction using long filename conversion 212 of FIG. 2.

Alternatively, or in addition, at least some of the executable instructions 626, including the persistent file delete instruction 628, may not be stored at the ROM 624 and may instead be stored at the memory array 694. The executable instructions including the persistent file delete instruction 628 may be retrieved from the memory array 694 and stored at the RAM 622. The processor core 630 may be configured to retrieve the executable instructions including the persistent file delete instruction 628 from the RAM 622 for execution.

One or more executable instructions 626, such as the persistent file delete instruction 628, may be retrieved by the load/store unit 634 and stored to the instruction cache 632. The persistent file delete instruction 628 at the instruction cache 632 may be scheduled and provided to one or more execution pipelines, such as an execution pipeline including the ALU unit 636. The ALU unit 636 may include dedicated circuitry to perform arithmetic and logic operations, such as addition and subtraction, AND, NOT, OR, exclusive-OR (XOR), other arithmetic or logic operations, or any combination thereof. The ALU unit 636 may receive data from, and write data to, the register file 638. The register file 638 may include multiple memory cells that may provide high speed access to the processor core 630 of data to be used for execution of instructions.

In a particular embodiment, the processor core 630 may be programmed to perform at least a portion of the method 500 of FIG. 5. For example, the processor core 630 may be programmed to receive an instruction to delete a data file via the host interface circuitry 610. The processor core 630 may also be programmed to initiate programming of multiple attribute bits of a directory entry at the memory array 694 that has a first entry type and that corresponds to the data file to mark the directory entry as having a second entry type. The processor core 630 may also be programmed to initiate programming of another bit of the directory entry to mark the entry as having an unused status.

The storage interface circuitry 640 may include data bus connectors 642, an output driver 644, input/output buffers and latches 646, and error correcting code (ECC) circuitry 648. The data bus connectors 642 may include electrical connectors to enable electrical signal propagation via the bus 606. The I/O buffers and latches 646 may be configured to store data that is received via the DMA/bus controller 620 to be transmitted via the bus 606 using electrical signals at the data bus connectors 642 that are generated by the output driver 644. In addition, or alternatively, the I/O buffers and latches 646 may store data values represented by electrical signals received at the data bus connectors 642 via the data bus 606, such as signals generated by the interface circuitry 690 of the storage component 608.

In a particular embodiment, the data bus 606 is a parallel bus that carries eight-bit or sixteen-bit data and commands from the storage interface circuitry 640 to the storage component 608. The storage interface circuitry 640 may include circuitry to assert one or more signal lines of the data bus 606, such as a device selection line, to select one or more particular storage components that are coupled to the data bus 606. The storage interface circuitry 640 may also be configured to receive data and signals from the storage component 608, such as acknowledgement signals.

The ECC circuitry 648 may include dedicated hardware and circuitry configured to perform operations using data and error correcting code (ECC) information to verify that the received data is not detected to have corrupted values. The data and the ECC information may be received as a result of a memory read from the storage component 608. For example, the received data may include additional bits representing an error correcting code, which may be encoded based on values of the data upon storage at the memory array 694. Corruption of one or more bits of the data, or one or more bits of the error correcting code, may be detectable by the ECC circuitry 648. For example, the storage interface circuitry 640 may include a flash memory interface, and the ECC circuitry 648 may be compliant with one or more flash error correcting code protocols.

Although various components depicted herein are illustrated as block components and described in general terms, such components may include one or more microprocessors, state machines, or other circuits configured to enable the disclosed data storage devices, such as the data storage device 104 of FIG. 1, to perform the particular functions attributed to such components. For example, the host interface 106, the controller 110, or both, of FIG. 1, may represent physical components, such as controllers, state machines, logic circuits, or other structures to enable the data storage device 104 to receive and respond to requests from a host device or from other external devices to delete a data file stored at the memory 120.

For example, the controller 110 of FIG. 1 may be implemented using a microprocessor or microcontroller programmed to respond to the deletion instruction 103 by initiating the selective cell overwrite operation 198. In a particular embodiment, the controller 110 of FIG. 1 includes executable instructions that are executed by a processor and the instructions may be stored at the memory 120. Alternatively, or in addition, executable instructions that are executed by the processor may be stored at a separate memory location that is not part of the memory 120, such as at a read-only memory (ROM) (not shown) at the controller 110.

In a particular embodiment, the data storage device 104 may be a portable device configured to be selectively coupled to one or more external devices. However, in other embodiments, the data storage device may be attached or embedded within one or more host devices, such as within a housing of a portable communication device. For example, the data storage device may be within a packaged apparatus such as a wireless telephone, personal digital assistant (PDA), gaming device or console, portable navigation device, or other device that uses internal non-volatile memory. In a particular embodiment, the data storage device 104 includes a non-volatile memory, such as a flash memory (e.g., NAND, NOR, Multi-Level Cell (MLC), Divided bit-line NOR (DINOR), AND, high capacitive coupling ratio (HiCR), asymmetrical contactless transistor (ACT), or other flash memories), an erasable programmable read-only memory (EPROM), an electrically-erasable programmable read-only memory (EEPROM), a read-only memory (ROM), a one-time programmable memory (OTP), or any other type of memory.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description. Accordingly, the disclosure and the figures are to be regarded as illustrative rather than restrictive.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method for handling a delete instruction, the method comprising:
in a device with a memory,
receiving an instruction to delete a data file, wherein the data file is stored at a first plurality of persistent memory cells of the memory, wherein the memory further stores a directory, the directory including a first entry and a second entry associated with the data file, wherein the first entry is of a first entry type and the second entry is of a second entry type, wherein the first entry includes a first bit and multiple attribute bits, the first bit being distinct from the multiple attribute bits, wherein the first entry type is a short filename entry, and the second entry type is a long filename entry, wherein the first entry is a first entry type and the second entry is a second entry type, wherein the first bit is at a first location of the first entry and the multiple attribute bits are at a second location of the first entry, wherein at least one bit separates the first location from the second location, and wherein the at least one bit is programmed independently of the instruction to delete the data file; and
in response to receiving the instruction to delete the data file:
modifying the multiple attribute bits of the first entry to change the type of the first entry from the first entry type to the second entry type;
programming the first bit of the first entry, wherein programming the first bit of the first entry indicates that the first entry has an unused status; and
modifying the second entry from the second entry type to an unused long filename entry,
wherein a combination of modifying the multiple attribute bits, modifying the second entry, and programming the first bit, causes the first entry and the second entry to have the unused status and to be inaccessible by a host device.

2. The method of claim 1, wherein the directory includes file allocation data that corresponds to a thirty-two bit file allocation table (FAT32) format.

3. The method of claim 1, further comprising programming data bits of the data file to overwrite content of the data file in response to receiving the instruction to delete the data file.

4. The method of claim 1, wherein at least one of the first entry and the second entry is stored at a second plurality of persistent memory cells.

5. The method of claim 1, wherein the directory further includes a third entry that is encoded as a second long filename entry corresponding to the data file and further comprising, in response to receiving the instruction to delete the data file:
programming a third bit of the third entry; and
programming a third plurality of bits of the third entry that stores third name data of the data file,
wherein the third bit of the third entry is distinct from the third plurality of bits and wherein programming the third bit of the third entry indicates that the second long filename entry has the unused status.

6. The method of claim 5, wherein the third entry is recognizable to the host as an unused long filename directory entry.

7. The method of claim 1, wherein the first bit is a first sequential bit of the first entry.

8. The method of claim 1, wherein the first bit is a most significant bit.

9. The method of claim 1, wherein the at least one bit is a least significant bit.

10. The method of claim 1, wherein the first entry and the second entry are stored at a one-time programmable portion of the memory.

11. The method of claim 1, wherein the first entry includes a reference to an entry of a file allocation table that is distinct from the directory.

12. The method of claim 1, wherein the first entry type is a short filename entry type that includes an eight-character filename and a three-character file extension, and wherein the long filename entry includes at least a portion of a long filename that exceeds eight characters.

13. The method of claim 1, wherein modifying the first entry includes changing the multiple attribute bits of the first entry.

14. A data storage device comprising:
a memory including a directory that includes file system data, the file system data including a first entry having a short filename corresponding to a data file and a second entry having a long filename corresponding to the data file, wherein the first entry and the second entry are associated with the data file, wherein the first entry is of a first entry type, and the second entry is of a second entry type, wherein the short filename includes a filename having a number of characters, wherein the short filename further includes a file extension, and wherein the long filename exceeds the number of characters; and
a memory controller operatively coupled to the memory, wherein the memory controller is configured to, in response to receiving an instruction to delete the data file:
mark the second entry as having an unused status by programming a first bit of the second entry, wherein programming the first bit of the second entry indicates that the long filename data has the unused status;
mark the first entry to indicate that the first entry has a long filename format by modifying multiple attribute bits of the first entry; and
mark the first entry as having the unused status by programming a second bit of the first entry, wherein the second bit is distinct from the multiple attribute bits, wherein the second bit is at a first location of the first entry and the multiple attribute bits are at a second location of the first entry, wherein at least one bit separates the first location from the second location, and wherein the at least one bit is programmed independently of the instruction to delete the data file,
wherein a combination of modifying the multiple attribute bits of the first entry, programming the first bit of the second entry, and programming the second bit of the first entry, causes the first entry and the second entry having the unused status to be inaccessible by a host device.

15. The data storage device of claim 14, wherein the first entry and the second entry are stored at a one-time programmable portion of the memory.

16. The data storage device of claim 14, wherein the memory controller is further configured to, in response to receiving the instruction to delete the data file:
program a first plurality of bits of the first entry that stores first name data of the data file, wherein programming the first plurality of bits overwrites the first name data; and program a second plurality of bits of the second entry that stores second name data of the data file, wherein programming the second plurality of bits overwrites the second name data.

17. The data storage device of claim 16, wherein the second plurality of bits includes a greater number of bits than the first plurality of bits.

18. The data storage device of claim 16, wherein the data file is stored at a one-time programmable memory, and wherein the memory controller is further configured to, in response to receiving the instruction to delete the data file, program data bits of the data file to change data stored at the data file.

19. The data storage device of claim 14, further comprising a storage interface that is coupled to the memory controller and that is coupled to the memory.

20. The data storage device of claim 14, wherein the first bit of the second entry is a first sequential bit of the second entry.

21. A data storage device comprising:
a memory controller; and
a memory, wherein the memory stores a data file and a directory, wherein the directory includes a first entry having a short filename corresponding to the data file, wherein the directory further includes a second entry having a long filename corresponding to the data file, wherein the first entry and the second entry are associated with the data file, wherein the first entry is of a first entry type, and the second entry is of a second entry type, wherein the short filename has a number of characters, wherein the short filename further includes a file extension, and wherein the long filename exceeds the number of characters,
wherein the memory controller is configured to, in response to receiving an instruction from a host to delete the data file:
modify multiple attribute bits of the first entry, wherein changing the multiple attribute bits modifies the first entry to a long filename format;
program a first bit of the first entry, wherein programming the first bit of the first entry indicates that a modified long filename entry has an unused status, the first bit being distinct from the multiple attribute bits, wherein the first bit is at a first location of the first entry and the multiple attribute bits are at a second location of the first entry, wherein at least one bit separates the first location from the second location, and wherein the at least one bit is programmed independently of the instruction to delete the data file; and
program a second bit of the second entry, wherein programming the second bit of the second entry indicates that the second entry has the unused status,
wherein a combination of modifying the multiple attribute bits, programming the first bit of the first entry, and programming the second bit of the second entry, causes the first entry and the second entry having the unused status to be inaccessible by a host device.

22. The data storage device of claim 21, wherein the first entry includes a thirty-two bit reference to an entry of a file allocation table.

23. The data storage device of claim 21, wherein, after programming the first bit, the second bit, and the multiple attribute bits, the first entry and the second entry are recognizable to the host as unused long filename directory entries.

24. The data storage device of claim 21, wherein the memory controller is further configured to, in response to receiving the instruction to delete the data file, program data bits of the data file.

25. A data storage device comprising:
a memory, wherein the memory stores a first directory entry and a second directory entry of a data file, the first directory entry having a first entry type and a used status, wherein the first entry type is a short filename entry, wherein the second directory entry is of a second entry type, wherein the second entry type is a long filename entry, wherein the first directory entry includes a first bit and multiple attribute bits, the first bit being distinct from the multiple attribute bits, wherein the first bit is at a first location of the first directory entry and the multiple attribute bits are at a second location of the first directory entry, wherein at least one bit separates the first location from the second location, and wherein the at least one bit is programmed independently of a delete command to delete the data file; and
a memory controller configured to, in response to receiving the delete command, modify the multiple attribute bits of the first directory entry to change the type of the first directory entry from the first entry type to the second entry type, program the first bit to indicate an unused status, and modify the second entry to an unused long filename entry, wherein a combination of modifying the multiple attribute bits of the first directory entry, modifying the second directory entry, and programming the first bit of the first directory entry, renders the first directory entry inaccessible to a host.

26. The data storage device of claim 25, wherein the first directory entry includes a short filename data, and wherein the memory includes a second directory entry having a long filename data.

27. The data storage device of claim 26, wherein the memory controller is further configured to program a second bit of the second directory entry.

28. The data storage device of claim 25, wherein the first directory entry includes a thirty-two bit reference to a file allocation table.

* * * * *

UNITED STATES PATENT AND TRADEMARK OFFICE
CERTIFICATE OF CORRECTION

PATENT NO. : 9,171,004 B2
APPLICATION NO. : 12/400334
DATED : October 27, 2015
INVENTOR(S) : Donald Ray Bryant-Rich et al.

It is certified that error appears in the above-identified patent and that said Letters Patent is hereby corrected as shown below:

In the Claims,

Column 16, Claim 25, Line 41, "first bit of the first directory entry, renders the first direc-" should be --first bit of the first directory entry renders the first direc- --.

Column 16, Claim 26, Line 44, "directory entry includes a short filename data, and wherein" should be --directory entry includes a short filename, and wherein--.

Signed and Sealed this
First Day of March, 2016

Michelle K. Lee
*Director of the United States Patent and Trademark Office*